(12) United States Patent
Robinson et al.

(10) Patent No.: US 11,879,405 B2
(45) Date of Patent: Jan. 23, 2024

(54) AFTERTREATMENT SYSTEM LOADING TOOL

(71) Applicant: Cummins Power Generation Inc., Minneapolis, MN (US)

(72) Inventors: Daniel J. Robinson, Columbus, IN (US); Frank L. Ruggiero, Covington, LA (US); Abhinav V. Rao, Columbus, IN (US); Azeezat Mohammed, Columbus, IN (US); Michael J. Zaitz, Summerville, SC (US); Shreyansh Gaur, Charleston, SC (US); Abhishek Manekar, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 17/383,660

(22) Filed: Jul. 23, 2021

(65) Prior Publication Data
US 2023/0023550 A1     Jan. 26, 2023

(51) Int. Cl.
F02D 41/00     (2006.01)
F02D 41/02     (2006.01)
G06F 3/14      (2006.01)

(52) U.S. Cl.
CPC ........... *F02D 41/0235* (2013.01); *G06F 3/14* (2013.01); *F02D 2200/08* (2013.01)

(58) Field of Classification Search
CPC ..... F02D 41/0235; F02D 2200/08; G06F 3/14
See application file for complete search history.

(56) References Cited

U.S. PATENT DOCUMENTS 5,491,631 A * 2/1996 Shirane ................. G01M 15/05
                                              701/33.9
5,598,833 A * 2/1997 Nitta ....................... A47J 36/30
                                              126/262

(Continued)

FOREIGN PATENT DOCUMENTS

EP      2 208 872 A1       7/2010
WO   WO-2020047301 A1 *  3/2020  ............... B60Q 9/00

OTHER PUBLICATIONS

European Search Report from EP App. No. 22178465.5 dated Nov. 11, 2022, 8 pages.

*Primary Examiner* — Matthew T Largi
(74) *Attorney, Agent, or Firm* — Foley & Lardner LLP

(57) ABSTRACT

Systems and apparatuses include one or more processing circuits comprising one or more memory devices coupled to one or more processors, the one or more memory devices configured to store instructions thereon that, when executed by the one or more processors, cause the one or more processors to: receive a target temperature and store the target temperature on the one or more memory devices, output the target temperature, receive temperature information from a sensor positioned downstream of an engine and upstream of a aftertreatment system catalyst, generate a current temperature based on the temperature information, output the current temperature, compare the current temperature to the target temperature, output a loading instruction based on the comparison of the current temperature and the target temperature, and generate a graphical user interface including the output target temperature, the output current temperature, and the output loading instruction.

19 Claims, 4 Drawing Sheets

(56) References Cited

U.S. PATENT DOCUMENTS

| | | | | |
|---|---|---|---|---|
| 6,250,260 | B1* | 6/2001 | Green | F02D 19/105 |
| | | | | 123/575 |
| 9,631,530 | B2* | 4/2017 | Koike | F01N 3/023 |
| 10,359,019 | B1* | 7/2019 | Springer | F02N 19/02 |
| 2010/0170227 | A1* | 7/2010 | Tsukada | E02F 9/0866 |
| | | | | 60/299 |
| 2012/0010786 | A1* | 1/2012 | Stickel | F01N 9/00 |
| | | | | 73/114.71 |
| 2013/0074481 | A1* | 3/2013 | Miura | F01N 9/002 |
| | | | | 60/311 |
| 2013/0110348 | A1* | 5/2013 | Jinbo | E02F 9/26 |
| | | | | 701/36 |
| 2014/0019025 | A1* | 1/2014 | Shinomiya | F02D 41/029 |
| | | | | 701/101 |
| 2015/0047325 | A1 | 2/2015 | Simon et al. | |
| 2015/0075490 | A1* | 3/2015 | Hull | F02D 41/1446 |
| | | | | 123/320 |
| 2015/0185545 | A1* | 7/2015 | Tetsuka | G02F 1/133382 |
| | | | | 180/90 |
| 2015/0246613 | A1* | 9/2015 | Shimazu | B60K 35/00 |
| | | | | 340/439 |
| 2016/0208665 | A1 | 7/2016 | Koike et al. | |
| 2017/0260890 | A1* | 9/2017 | Uehara | F01N 11/00 |
| 2020/0011197 | A1* | 1/2020 | Lindgren | C02F 1/42 |
| 2022/0178111 | A1* | 6/2022 | Nanbu | E02F 9/2292 |

\* cited by examiner

AFTERTREATMENT SYSTEM LOADING TOOL

TECHNICAL FIELD

The present disclosure relates to prime mover systems. More particularly, the present disclosure relates to systems and methods for the operation of aftertreatment systems and internal combustion engines.

BACKGROUND

Internal combustion engine systems (e.g., spark ignition or compression ignition) used in offshore and marine environments have not historically included aftertreatment systems for reducing exhaust gas emissions (e.g., NOx, unburnt hydrocarbons (uHC), etc.). Recently, emissions control systems including exhaust gas aftertreatment systems are being required in offshore and marine environments.

Generator sets used for land based installations include aftertreatment systems. For example, selective catalytic reduction (SCR) systems include a catalyst that is used in the conversion of exhaust gas emissions. SCR catalysts define load capacities and operation of an engine at a low temperature output over time can increase the load on the SCR catalyst. Cleaning or regeneration operations can include operation of the engine at a high temperature output that cleans or burns load out of the SCR catalyst.

SUMMARY

One embodiment relates to an apparatus that includes one or more processing circuits comprising one or more memory devices coupled to one or more processors, the one or more memory devices configured to store instructions thereon that, when executed by the one or more processors, cause the one or more processors to: receive a target temperature and store the target temperature on the one or more memory devices, output the target temperature, receive temperature information from a sensor positioned downstream of an engine and upstream of a aftertreatment system catalyst, generate a current temperature based on the temperature information, output the current temperature, compare the current temperature to the target temperature, output a loading instruction based on the comparison of the current temperature and the target temperature, and generate a graphical user interface including the output target temperature, the output current temperature, and the output loading instruction.

Another embodiment relates to a system that includes a sensor positioned downstream of an engine and upstream of a aftertreatment system catalyst; one or more processing circuits comprising one or more memory devices coupled to one or more processors, the one or more memory devices configured to store instructions thereon that, when executed by the one or more processors, cause the one or more processors to receive a target temperature and store the target temperature on the one or more memory devices, output the target temperature, receive temperature information from the sensor, generate a current temperature based on the temperature information, output the current temperature, compare the current temperature to the target temperature, and output a loading instruction based on the comparison of the current temperature and the target temperature; and a human machine interface (HMI) including a display and structured to generate a graphical user interface (GUI) including the output target temperature, the output current temperature, and the output loading instruction.

Another embodiment relates to a method that includes receiving a target temperature, storing the target temperature on one or more memory devices, outputting the target temperature, receiving temperature information from a sensor positioned downstream of an engine and upstream of a aftertreatment system catalyst, generating a current temperature based on the temperature information, outputting the current temperature, comparing the current temperature to the target temperature, outputting a loading instruction based on the comparison of the current temperature and the target temperature, and generating a graphical user interface (GUI) including the output target temperature, the output current temperature, and the output loading instruction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for providing a control system for aftertreatment system cleaning. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, apparatuses, and methods for a control system for aftertreatment system cleaning that monitors idle time and engine out temperature to determine a catalyst load and then provide parameters for the control of a cleaning action to regenerate or clean the catalyst. In some embodiments, the parameters include a target engine out temperature of exhaust gases and a time for regeneration.

In some marine application systems, an engine provider and an aftertreatment system provider may be different such that active thermal management strategies for the aftertreatment system are not integrated into the engine control system and maintenance of the aftertreatment system (e.g., catalyst regeneration) relies on user loading, where the user or operator of the engine system manually controls the engine to realize a cleaning operation (e.g., catalyst regeneration).

Figure 1:
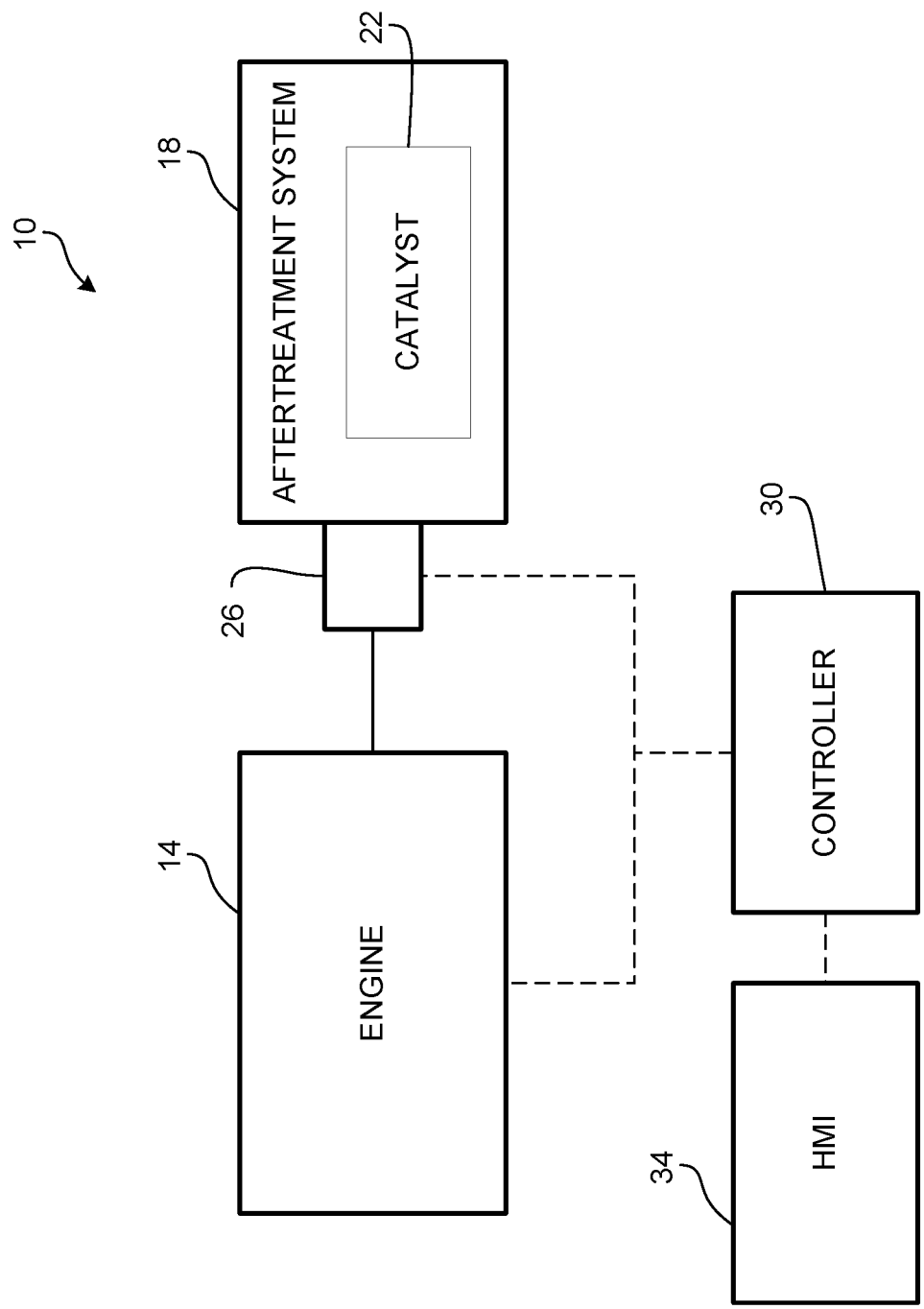
FIG. 1 is a schematic diagram of an engine system, according to some embodiments.

As shown in FIG. 1, an engine system 10 includes an engine 14 and an engine exhaust gas aftertreatment system 18. In some embodiments the engine 14 is an internal combustion engine such as a compression ignition engine (e.g., burning diesel fuel) or a spark ignition engine (e.g., burning gasoline). In some embodiments, the engine 14 is a marine engine used for propulsion (e.g., connected to a transmission and a prop), auxiliary power, power generation (e.g., as an engine within a generator set). The engine 14 also includes loads connected to the engine 14 that can be selectively engaged and disengaged. For example, the engine 14 includes a radiator fan, pumps, a power take off, etc. Engagement of the loads increases the loading on the engine 14 and results in an increase in engine out temperature of exhaust gases leaving the engine 14.

The aftertreatment system 18 receives exhaust gases from the engine 14 and operates to reduce the emissions that escape the engine system 10 such as NOx, unburnt hydrocarbons (uHC), and other emissions. Older marine application engine systems did not require aftertreatment systems for the reduction of emissions. In some embodiments, the aftertreatment system 18 includes a selective catalytic reduction (SRC) system that includes a particulate filter, a diesel exhaust fluid (DEF) dosing system (e.g., a urea injection system), and a catalyst 22. The DEF dosing system injects the DEF into the exhaust stream up stream of the catalyst 22 and the NOx are converted to nitrogen water, and CO2 within the catalyst before exiting the aftertreatment system (e.g, through a muffler or sound mitigation system).

The engine system 10 also includes a sensor array including an SRC inlet temperature sensor 26 positioned within the exhaust gas flow stream downstream of the engine 14 and upstream of the aftertreatment system 18. The sensor 26 sends information indicative of the temperature of the exhaust gas entering the aftertreatment system 18.

A controller 30 is communicatively coupled to the engine 14 and the sensor 26 for control on the engine 14. In some embodiments, the controller 30 includes an engine control unit (ECU) or some aspects of an ECU. A human machine interface (HMI) 34 is communicatively coupled to the controller 30 to provide a graphical user interface (GUI) to a display of the HMI 34. In some embodiments, the GUI is created by the controller 30 and sent to the HMI 34. In some embodiments, the GUI is generated by the HMI 34 based on information received from the controller 30. The GUI displayed on the HMI 34 display includes information regarding the loading of the catalyst and generates instructions for a cleaning action. In some embodiments, the HMI 34 is positioned in a marine engine panel located in an engine room. In some embodiments, the HMI 34 is a remote panel located remotely form the engine system 10.

As the components of FIG. 1 are shown to be embodied in the engine system 10, the controller 30 may be structured as one or more electronic control units (ECU). The controller 30 may be separate from or included with at least one of a transmission control unit, an exhaust aftertreatment control unit, a powertrain control module, an engine control module, etc. The function and structure of the controller 30 is described in greater detail in FIG. 2. In some embodiments, the controller 30 is not in control of and/or in communication with the aftertreatment system 18.

Figure 2:
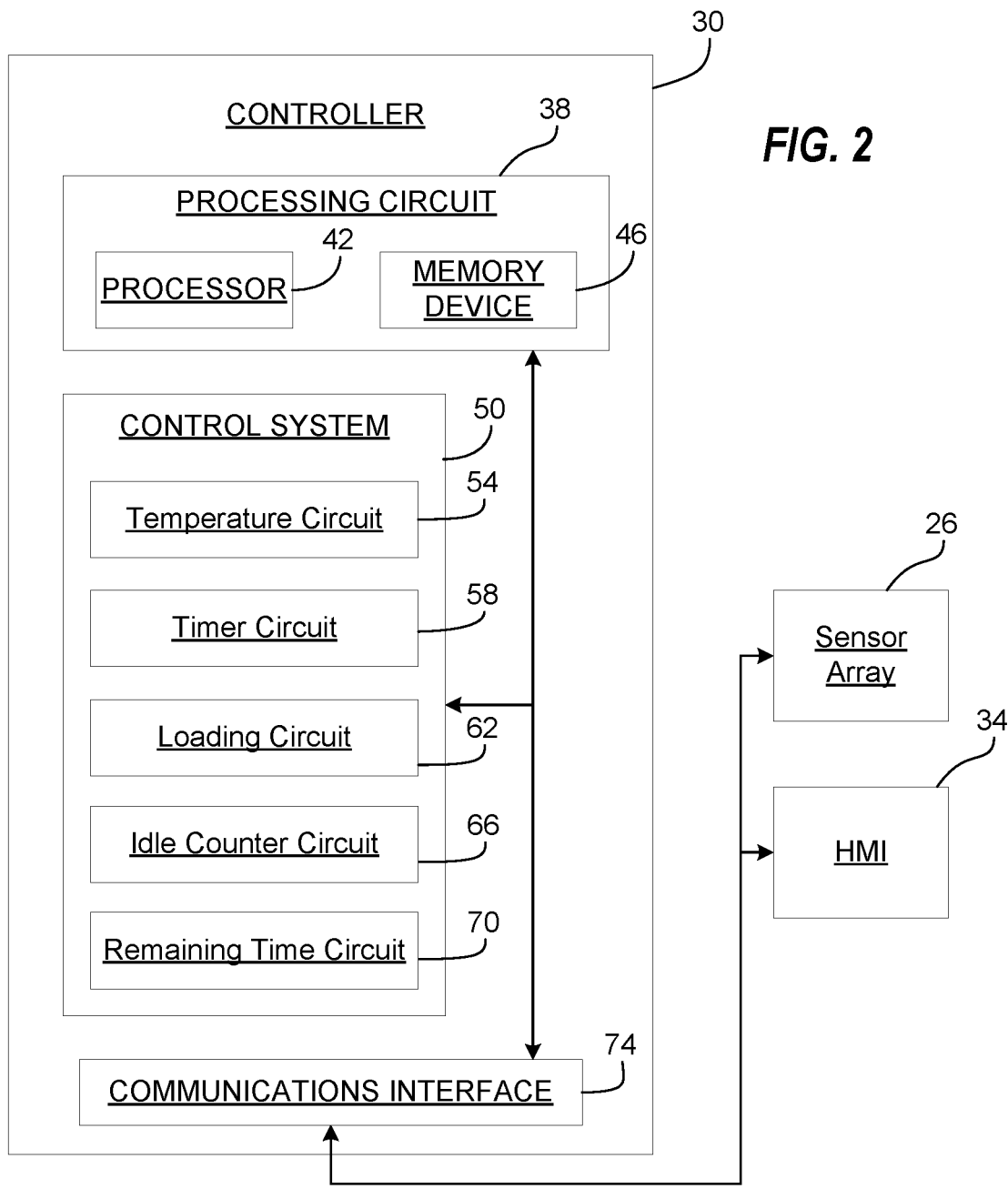
FIG. 2 is a schematic of a controller of the engine system of FIG. 1, according to some embodiments.

Referring now to FIG. 2, a schematic diagram of the controller 30 of the engine system 10 of FIG. 1 is shown according to an example embodiment. As shown in FIG. 2, the controller 30 includes a processing circuit 38 having a processor 42 and a memory device 46, a control system 50 having a temperature circuit 54, a timer circuit 58, a loading circuit 62, an idle counter circuit 66, and a remaining time circuit 70, and a communications interface 74. Generally, the controller 30 is structured to receive aftertreatment system input temperature information from the sensor 26, monitor the temperature over time, calculate catalyst loading over time based on the monitored temperature over time, generate a loading instruction (e.g., Apply More Load), determine an available idle time (e.g., how much longer the engine 14 can be operated at idle or a low temperature operational condition), and generate a remaining cleaning time instruction (e.g., how much longer the loading instruction will be maintained).

In one configuration, the temperature circuit 54, the timer circuit 58, the loading circuit 62, the idle counter circuit 66, and the remaining time circuit 70 are embodied as machine or computer-readable media that is executable by a processor, such as processor 42. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the temperature circuit 54, the timer circuit 58, the loading circuit 62, the idle counter circuit 66, and the remaining time circuit 70 are embodied as hardware units, such as electronic control units. As such, the temperature circuit 54, the timer circuit 58, the loading circuit 62, the idle counter circuit 66, and the remaining time circuit 70 may be embodied as one or more circuitry components including, but not limited to, processing circuitry, network interfaces, peripheral devices, input devices, output devices, sensors, etc. In some embodiments, the temperature circuit 54, the timer circuit 58, the loading circuit 62, the idle counter circuit 66, and the remaining time circuit 70 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the temperature circuit 54, the timer circuit 58, the loading circuit 62, the idle counter circuit 66, and the remaining time circuit 70 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The temperature circuit 54, the timer circuit 58, the loading circuit 62, the idle counter circuit 66, and the remaining time circuit 70 may also include programmable hardware devices such as field programmable gate arrays, programmable array logic, programmable logic devices or the like. The temperature circuit 54, the timer circuit 58, the loading circuit 62, the idle counter circuit 66, and the remaining time circuit 70 may include one or more memory devices for storing instructions that are executable by the processor(s) of the temperature circuit 54, the timer circuit 58, the loading circuit 62, the idle counter circuit 66, and the remaining time circuit 70. The one or more memory devices and processor(s) may have the same definition as provided below with respect to the memory device 46 and processor 42. In some hardware unit configurations, the temperature circuit 54, the timer circuit 58, the loading circuit 62, the idle counter circuit 66, and the remaining time circuit 70 may be geographically dispersed throughout separate locations. Alternatively and as shown, the temperature circuit 54, the timer circuit 58, the loading circuit 62, the idle counter circuit 66, and the remaining time circuit 70 may be embodied in or within a single unit/housing, which is shown as the controller 30.

In the example shown, the controller 30 includes the processing circuit 38 having the processor 42 and the memory device 46. The processing circuit 38 may be structured or configured to execute or implement the instructions, commands, and/or control processes described herein with respect to temperature circuit 54, the timer circuit 58, the loading circuit 62, the idle counter circuit 66, and the remaining time circuit 70. The depicted configuration represents the temperature circuit 54, the timer circuit 58, the loading circuit 62, the idle counter circuit 66, and the remaining time circuit 70 as machine or computer-readable media. However, as mentioned above, this illustration is not meant to be limiting as the present disclosure contemplates other embodiments where the temperature circuit 54, the timer circuit 58, the loading circuit 62, the idle counter circuit 66, and the remaining time circuit 70, or at least one circuit of the temperature circuit 54, the timer circuit 58, the loading circuit 62, the idle counter circuit 66, and the remaining time circuit 70, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 42) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., temperature circuit 54, the timer circuit 58, the loading circuit 62, the idle counter circuit 66, and the remaining time circuit 70 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 46 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 46 may be communicably connected to the processor 42 to provide computer code or instructions to the processor 42 for executing at least some of the processes described herein. Moreover, the memory device 46 may be or include tangible, non-transient volatile memory or non-volatile memory. Accordingly, the memory device 46 may include database components, object code components, script components, or any other type of information structure for supporting the various activities and information structures described herein.

The temperature circuit 54 is structured to receive temperature information from the sensor 26 via the communications interface 74, determine a current temperature of exhaust gases entering the aftertreatment system 18 based on the temperature information, output the current temperature to the HMI 34 via the communications interface 74, receive a target temperature for cleaning or regenerating the catalyst (e.g., the temperature that is desired for a cleaning operation), and output the target temperature to the HMI 34 via the communications interface 74. In some embodiments, the current temperature includes a temperature value (e.g., 250° C.) and a current temperature code in the form of a current temperature color code. The current temperature color code can include a red color when the current temperature value is less than a loading threshold temperature (e.g., 250° C.), a yellow color when the current temperature value is between or equal to the loading threshold temperature and a cleaning threshold temperature (e.g., 300° C.), and a green color when the current temperature value is greater than the cleaning threshold temperature. In some embodiments, the target temperature is predetermined and stored in the memory device 46. In some embodiments, the target temperature is entered by the user via the HMI 34. In some embodiments, the temperature circuit 54 queries a database and receives the target temperature (e.g., a database stored within the memory device 46 or external to the controller 30). The query can include catalyst information (e.g., a model number, SKU #, serial number, etc.), information about the aftertreatment system 18 or other information regarding the engine system 10. In some embodiments, the current temperature is received from a third party controller or system via a data link communicably coupled to the communications interface 74 (e.g., a SPN4360 datalink).

The timer circuit 58 is structured to provide time to the control system 50 and includes real time clock (RTC) that provides time stamps and other timing functions.

The loading circuit 62 is structured to compare the current temperature to the target temperature, and output a loading instruction to the HMI 34 via the communications interface 74. When the current temperature is less than the target temperature, the loading circuit 62 outputs an apply more load instruction to the HMI 34 via the communication interface 74. When the current temperature is greater than or equal to the target temperature, the loading circuit 62 outputs a hold engine load instruction to the HMI 34 via the communication interface 74. In some embodiments, the loading instruction includes a loading code in the form of a loading color code. For example, the loading color code may be red when the apply more load instruction is output and the loading color code may be green when the hold engine load instruction is output.

The idle counter circuit 66 is structured to receive the temperature information from the sensor 26 via the communications interface 74 or from the temperature circuit 54, receive time information from the timer circuit 58, generate an available idle time parameter, and output the available idle time parameter to the HMI 34 via the communications interface 74. In some embodiments, the available idle time parameter includes a percentage value and a percentage bar that indicates the percent loading of the catalyst 22. For example, an available idle time parameter of one hundred percent (100%) indicates a fully cleaned catalyst 22 and an available idle time parameter of zero percent (0%) indicates a fully loaded catalyst 22. In some embodiments, the available idle time parameter includes an idle code in the form of an idle color code. For example, the idle color code may be green when the available idle time parameter is greater than a warning idle time threshold (e.g., 40%), yellow when the available idle time parameter is between or equal to the warning idle time threshold and an alarm idle time threshold (e.g., 20%), and red when the available idle time parameter is less than the lower idle time threshold. In some embodiments, the idle color code is shown as the percentage bar on the GUI. In some embodiments, the thresholds for the idle color code are different, as desired.

In some embodiments, the idle counter circuit 66 also includes a maximum idle time (e.g., twelve hours) that affects the available idle time parameter. For example, the available idle time parameter will always be zero percent (0%) when the idle counter circuit 66 determines that the maximum idle time has been reached.

The idle counter circuit 66 increments the available idle time parameter when the current temperature is greater than the cleaning threshold temperature, holds the available idle time parameter (e.g., no change to the available idle time parameter) when the current temperature is between or equal to the cleaning threshold temperature and the loading threshold temperature, and decrements the available idle time parameter when the current temperature is less than the loading threshold temperature. In some embodiments, the rate of increment or decrement of the available idle time parameter is dynamic and changes in response to the current temperature relative to either the loading threshold temperature or the cleaning threshold temperature. For example, the rate of decrement may increase as the current temperature continues to drop below the loading threshold temperature (e.g., a faster rate of decrement at 175° C. and a slower rate of decrement at 195° C.). In some embodiments, the increment and decrement rates may be based on a linear algorithm, a non-linear algorithm, a step function (e.g., the loading threshold temperature includes multiple thresholds indicating different rates of decrement), a model based function, or an artificial intelligence engine that receives input from the engine system 10 and outputs the available idle time parameter based on historical operation information of the engine system 10.

In some embodiments, the idle counter circuit 66 compares the available idle time parameter to the warning idle time threshold (e.g., 40%) and generates a warning signal that may be sent to an operator. For example, the warning signal may include a text message, a push notification sent to a mobile application hosted on a user device, an audible alarm, a visual alarm, a vibratory alarm, or another type of alarm that alerts the operator that an increase in load should be performed soon.

In some embodiments, the idle counter circuit 66 compares the available idle time parameter to the alarm idle time threshold (e.g., 20%) and generates an alarm signal that may be sent to an operator. For example, the alarm signal may include a text message, a push notification sent to a mobile application hosted on a user device, an audible alarm, a visual alarm, a vibratory alarm, or another type of alarm that alerts the operator that an increase in load should be performed immediately.

The remaining time circuit 70 is structured to receive the temperature information from the sensor 26 via the communications interface 74 or from the temperature circuit 54, receive time information from the timer circuit 58, generate a remaining time parameter, and output the remaining time parameter to the HMI 34 via the communications interface 74. In some embodiments, the remaining time parameter is based on the available idle time parameter generated by the idle counter circuit 66. For example, the remaining time circuit 70 may receive the available idle time parameter and determine the remaining time parameter (e.g., forty five minutes). The remaining time parameter indicates how long the engine system 10 will take to clean the catalyst 22 once the current temperature is raised to and maintained greater than the cleaning threshold temperature. The remaining time circuit 70 decrements the remaining time parameter when the current temperature is greater than the cleaning threshold temperature, holds the remaining time parameter (e.g., no change to the remaining time parameter) when the current temperature is between or equal to the cleaning threshold temperature and the loading threshold temperature, and increments the remaining time parameter when the current temperature is less than the loading threshold temperature. In some embodiments, the rate of increment or decrement of the remaining time parameter is dynamic and changes in response to the current temperature relative to either the loading threshold temperature or the cleaning threshold temperature similar to the available idle time parameter discussed above. In some embodiments, the remaining time parameter is determined as an inverse value of the available idle time parameter that is converted to a time value. As the loading on the catalyst is reduced during a cleaning activity, the available idle time increases and the remaining time parameter decreases.

As discussed above, the temperature circuit 50 outputs the target temperature and the current temperature, the loading circuit 62 outputs the loading instruction, the idle counter circuit 66 outputs the available idle time parameter, and the remaining time circuit 70 outputs the remaining time parameter to the HMI 34. In some embodiments, the controller 30 generates and updates a GUI based on the outputs of the control system 50 that is communicated to the HMI 34 via the communications interface 74. In some embodiments, the GUI is generated within the HMI 34 based on the outputs of the control system 50.

Figure 3:
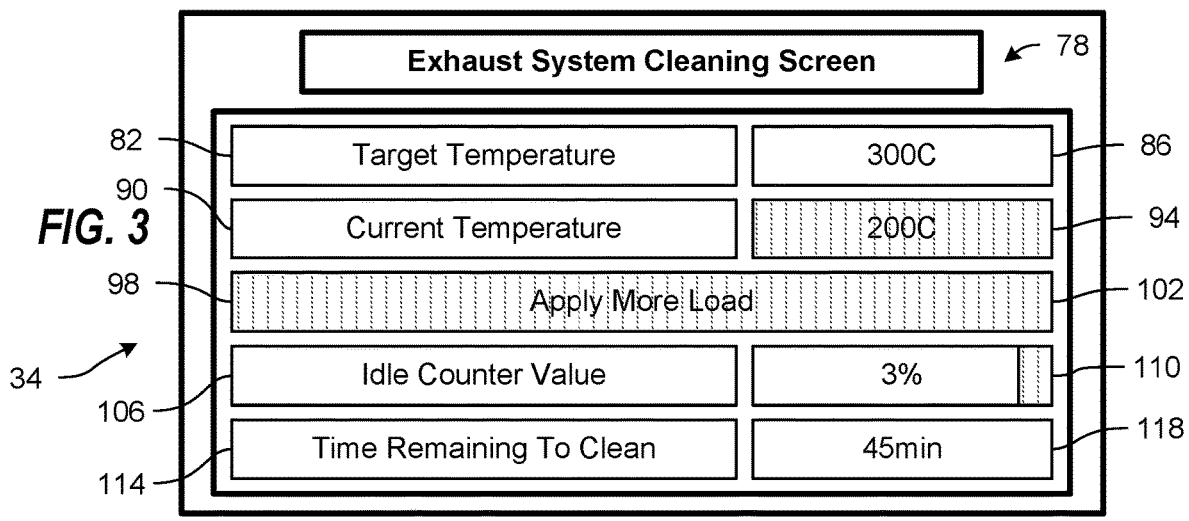
FIG. 3 is a schematic diagram of a human machine interface (HMI) of the engine system of FIG. 1, according to some embodiments.
Figure 4:
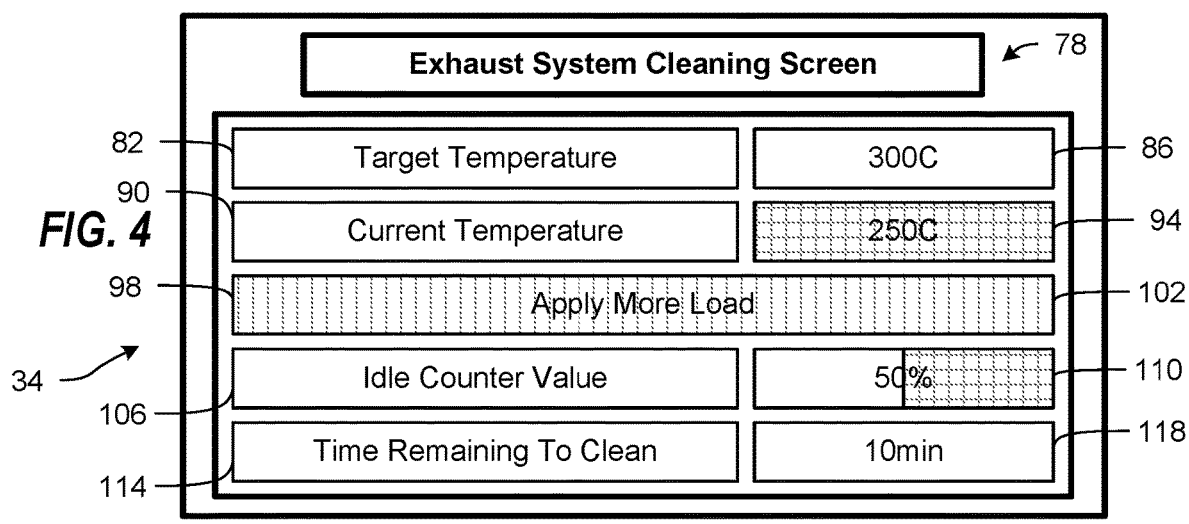
FIG. 4 is a schematic diagram of the HMI of FIG. 3, according to some embodiments.
Figure 5:
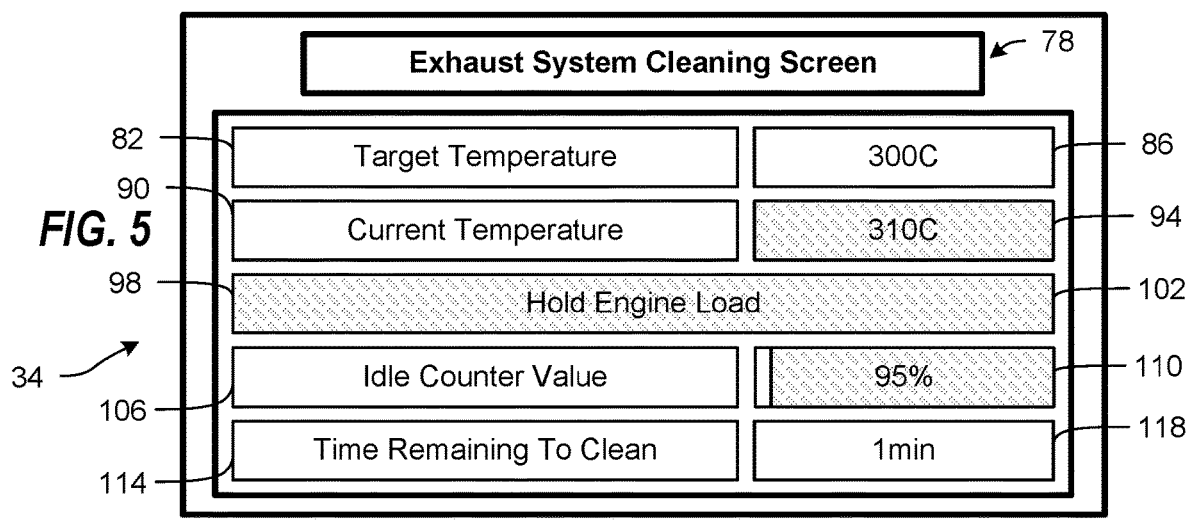
FIG. 5 is a schematic diagram of the HMI of FIG. 3, according to some embodiments.

As shown in FIGS. 3-5, an exhaust system cleaning screen GUI 78 of the HMI 34 includes a target temperature label 82, a target temperature field 86 that displays the target temperature, a current temperature label 90, a current temperature field 94 that displays the current temperature and the current temperature color code, a loading instruction label 98, a loading instruction field 102 that displays the loading instruction and the loading color code, an idle counter label 106, an idle counter field 110 that displays the available idle time parameter and the idle color code, a remaining time label 114, and a remaining time field 118 that displays the remaining time parameter.

As shown in FIG. 3, the target temperature is set at three hundred degrees Celsius (300° C.) within the temperature circuit 54 and the target temperature is output by the temperature circuit 54 for display in the target temperature field 86. In some embodiments, the target temperature may be greater than or less than 300° C. as desired.

The temperature circuit 54 also outputs the current temperature to the current temperature field 94. As shown in FIG. 3, the current temperature of exhaust gas entering the aftertreatment system 18 is two-hundred degrees Celsius (200°). The temperature circuit 54 compares the current temperature to the loading threshold temperature (e.g., two-hundred-fifty degrees Celsius (250° C.)) and the cleaning threshold temperature (e.g., three-hundred degree Celsius (300° C.)), determines that the current temperature is less than the loading threshold temperature, and outputs a red current temperature color code to the current temperature field 94.

The loading circuit 62 compares the current temperature to the cleaning threshold temperature (e.g., 300° C.) and generates the loading instruction based on the comparison. As shown in FIG. 3, the current temperature (200° C.) is less than the cleaning threshold temperature (e.g., 300° C.) and the apply more load instruction and the red loading color code is output to the loading instructions field 102.

The idle counter circuit 66 generates the available idle time parameter and outputs the available idle time parameter to the idle counter field 110. The idle counter field 110 shown in FIG. 3 displays a 3% available idle time parameter and a red idle color code.

The remaining time circuit 70 generates the remaining time parameter and outputs the remaining time parameter to the remaining time field 118. The remaining time field 118 shown in FIG. 3 displays a 45 minutes remaining time parameter.

As shown in FIG. 4, the temperature circuit 54 outputs the current temperature of two-hundred-fifty degrees Celsius (250°). The temperature circuit 54 compares the current temperature to the loading threshold temperature (e.g., two-hundred-fifty degrees Celsius (250° C.)) and the cleaning threshold temperature (e.g., three-hundred degree Celsius (300° C.)), determines that the current temperature is between or equal to the loading threshold temperature and the cleaning threshold temperature, and outputs a yellow current temperature color code to the current temperature field 94.

The loading circuit 62 compares the current temperature (250° C.) to the cleaning threshold temperature (e.g., 300° C.) and generates the loading instruction based on the comparison. As shown in FIG. 4, the current temperature (250° C.) is less than the cleaning threshold temperature (e.g., 300° C.) and the apply more load instruction and the red loading color code is output to the loading instructions field 102.

The idle counter circuit 66 generates the available idle time parameter and outputs the available idle time parameter to the idle counter field 110. The idle counter field 110 shown in FIG. 4 displays a 50% available idle time parameter and a yellow idle color code.

The remaining time circuit 70 generates the remaining time parameter and outputs the remaining time parameter to the remaining time field 118. The remaining time field 118 shown in FIG. 4 displays a 10 minutes remaining time parameter.

As shown in FIG. 5, the temperature circuit 54 outputs the current temperature of three-hundred-ten degrees Celsius (310°). The temperature circuit 54 compares the current temperature to the loading threshold temperature (e.g., two-hundred-fifty degrees Celsius (250° C.)) and the cleaning threshold temperature (e.g., three-hundred degree Celsius (300° C.)), determines that the current temperature is greater the cleaning threshold temperature, and outputs a green current temperature color code to the current temperature field 94.

The loading circuit 62 compares the current temperature (310° C.) to the cleaning threshold temperature (e.g., 300° C.) and generates the loading instruction based on the comparison. As shown in FIG. 5, the current temperature (310° C.) is greater than the cleaning threshold temperature (e.g., 300° C.) and the hold engine load instruction and the green loading color code is output to the loading instructions field 102.

The idle counter circuit 66 generates the available idle time parameter and outputs the available idle time parameter to the idle counter field 110. The idle counter field 110 shown in FIG. 5 displays a 95% available idle time parameter and a green idle color code.

The remaining time circuit 70 generates the remaining time parameter and outputs the remaining time parameter to the remaining time field 118. The remaining time field 118 shown in FIG. 5 displays a 1 minutes remaining time parameter.

Figure 6:
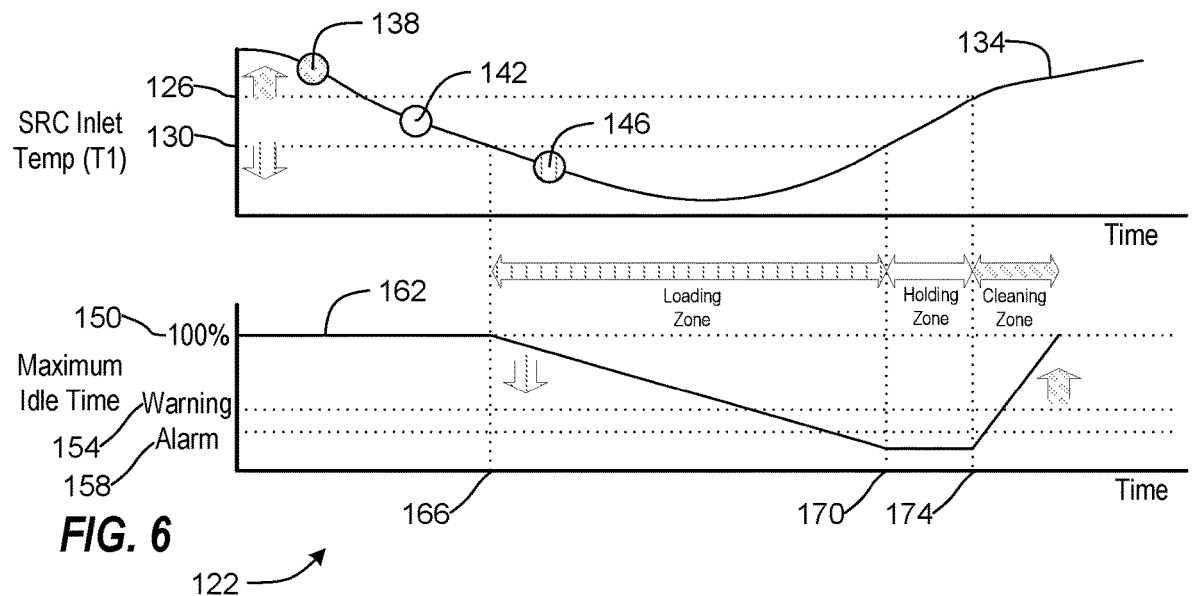
FIG. 6 is a graphing showing operating parameters of the engine system of FIG. 1, according to some embodiments.

As shown in FIG. 6, a chart 122 including aftertreatment system inlet temperature (e.g., as measured by the sensor 26) over time includes the cleaning threshold temperature 126 and the loading threshold temperature 130. The current temperature 134 changes over time dependent on operation and loading of the engine system 10. At stage 138, the current temperature is above the cleaning threshold temperature 126 and the catalyst 22 is undergoing regeneration. During stage 138, the current temperature and the green current temperature color code are being output to the current temperature field 94 of the GUI 78. At stage 142, the temperature is between or equal to the cleaning threshold temperature 126 and the loading threshold temperature 130 and the catalyst load is holding (e.g., neither loading nor regenerating significantly). During stage 142, the current temperature and the yellow current temperature color code are being output to the current temperature field 94 of the GUI 78. At stage 146, the current temperature is below the loading threshold temperature 130 and the catalyst 22 is undergoing loading. During stage 138, the current temperature and the red current temperature color code are being output to the current temperature field 94 of the GUI 78.

With continued reference to FIG. 6, the available idle time parameter 162 is charted over time and compared to a fully cleaned status 150, a warning threshold 154, and an alarm threshold 158. The available idle time parameter 162 is 100% while the current temperature 134 is at stage 138 (i.e., cleaning) and stage 142 (i.e., holding) and the available idle time parameter 162 and the green idle color code are output to the GUI 78. At time 166, the current temperature 134 drops below the loading threshold temperature 130 and the catalyst 22 begins loading at stage 146. After time 166, the available idle time parameter 162 decreases and the changing available idle time parameter 162 and idle color code are output to the GUI 78. A warning signal may be generated by the idle counter circuit 66 when the available idle time parameter 162 is less than the warning threshold 154 and an alarm signal may be generated by the idle counter circuit 66 when the available idle time parameter 162 is less than the alarm threshold 158.

At time 170, the load on the engine 14 has increased and the resulting current temperature 134 is above the loading threshold temperature 130 and below the cleaning threshold temperature 126 such that the catalyst 22 is holding load and the available idle time parameter 162 is not changing.

At time 174, the engine load has increased and the resulting current temperature 134 is above the cleaning threshold temperature 126 such that the catalyst 22 is being cleaned and the available idle time parameter 162 is increasing.

Figure 7:
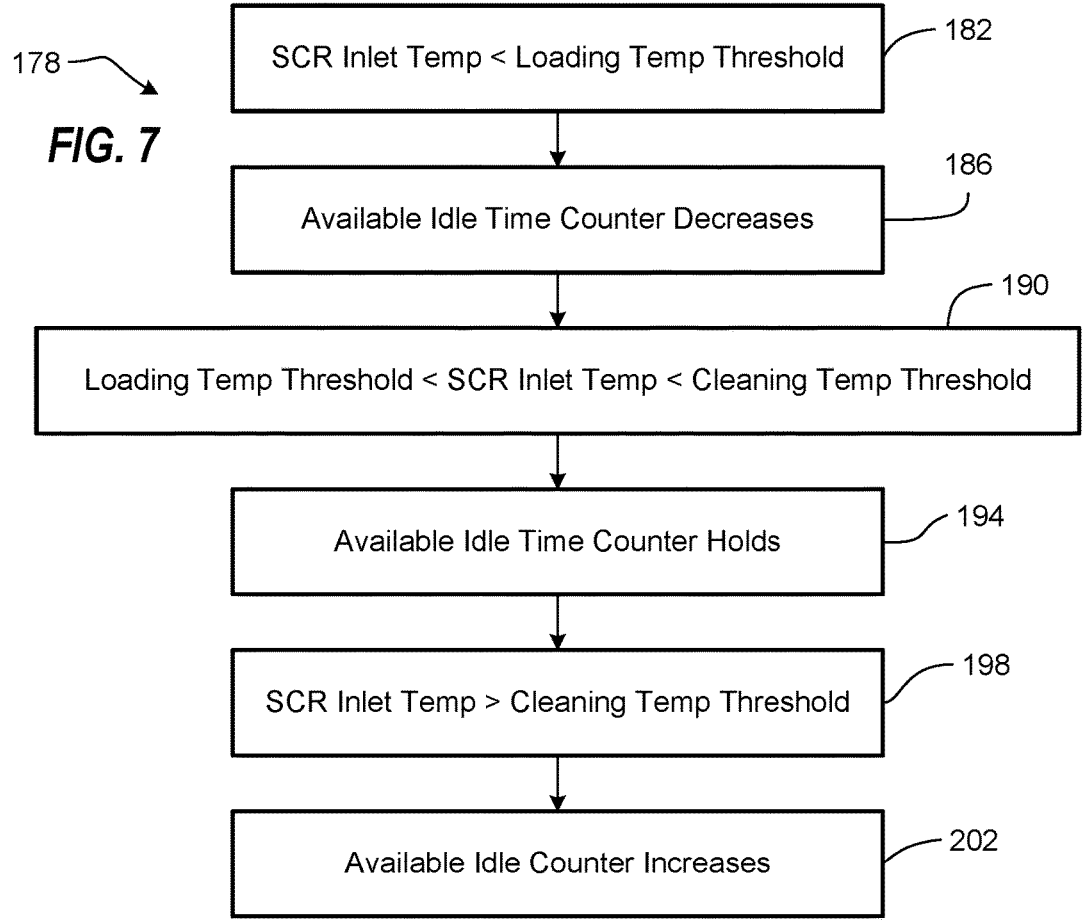
FIG. 7 is a flow diagram showing a method of operating the engine system of FIG. 1, according to some embodiments.

As shown in FIG. 7, a method 178 of determining the available idle time parameter is includes comparing the current temperature to the loading threshold temperature at step 182. If the current temperature is less than the loading threshold temperature, the available idle time parameter is decremented at step 186. If the current temperature is between the loading threshold temperature and the cleaning threshold temperature at step 190, then the available idle time parameter is held constant at step 194. If the current temperature is greater than the cleaning threshold temperature at step 198, then the available idle time parameter is incremented at step 202.

The controller 30 and the HMI 34 advantageously notify the operator if he or she is applying the correct amount of load to the engine 14 to perform exhaust system cleaning. The processing of information within the controller allows for the generation of dynamic GUIs that change over time to display information and instructions. The GUIs include a minimum temperature (e.g., the target temperature) to perform exhaust system cleaning a current temperature entering an SRC aftertreatment system (e.g., the aftertreatment system 18) with color code (e.g., red, yellow, and green) to provide a quick visual notification of if enough load is being applied, a loading instruction including either "Apply more load" or "Hold Engine Load", the available idle time parameter percentage, and time remaining to clean. The loading code, current temperature code, and idle code discussed above are represented in a non-limiting example as color based codes. In some embodiments, numerical, graphical, number, symbol, or other code types may be used to convey meaning as desired.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 30 may include any number of circuits for completing the functions described herein. For example, the activities and functionalities of the temperature circuit 54, the timer circuit 58, the loading circuit 62, the idle counter circuit 66, and the remaining time circuit 70 may be combined in multiple circuits or as a single circuit. Additional circuits with additional functionality may also be included. Further, the controller 30 may further control other activity beyond the scope of the present disclosure.

As mentioned above and in one configuration, the "circuits" may be implemented in machine-readable medium for execution by various types of processors, such as the processor 42 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the engine system 10 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An apparatus, comprising:
   one or more processing circuits comprising one or more memory devices coupled to one or more processors, the one or more memory devices configured to store instructions thereon that, when executed by the one or more processors, cause the one or more processors to:
   receive a target temperature and store the target temperature on the one or more memory devices;
   receive temperature information from a sensor positioned downstream of an engine and upstream of an aftertreatment system catalyst;
   generate a current temperature based on the temperature information;
   compare the current temperature to the target temperature;
   generate a loading instruction for loading the engine based on the comparison of the current temperature and the target temperature;
   determine an available idle time parameter value identifying an amount of time to load the aftertreatment system catalyst in the engine, when the current temperature is greater than a cleaning threshold temperature;
   generate a first idle code when the available idle time parameter value is greater than a warning idle time threshold;
   generate a second idle code when the available idle time parameter value is less than or equal to the warning idle time threshold and greater than an alarm idle time threshold;
   generate a third idle code when the available idle time parameter value is less than or equal to the alarm idle time threshold; and
   generate graphical user interface data configured to cause a human machine interface to generate a graphical user interface including the target temperature, the current temperature, the loading instruction, the available idle time parameter value, and the idle code.

2. The apparatus of claim 1, wherein the current temperature includes a current temperature value and a current temperature code.

3. The apparatus of claim 2, wherein the one or more memory devices are further configured to store instructions thereon that, when executed by the one or more processors, cause the one or more processors to:
   compare the current temperature to the cleaning threshold temperature and a loading threshold temperature;
   generate a first current temperature code when the current temperature is greater than the cleaning threshold temperature;
   generate a second current temperature code when the current temperature is less than or equal to the cleaning threshold temperature and greater than or equal to the loading threshold temperature; and
   generate a third current temperature code when the current temperature is less than the loading threshold temperature.

4. The apparatus of claim 1, wherein the loading instruction includes an apply more load instruction or a hold engine load instruction, and a loading code.

5. The apparatus of claim 4, wherein the one or more memory devices are further configured to store instructions thereon that, when executed by the one or more processors, cause the one or more processors to:
   compare the current temperature to the target temperature;
   generate a loading code indicative of a satisfactory engine loading when the current temperature is greater than or equal to the target temperature; and
   generate a current temperature code indicative of an unsatisfactory current temperature when the current temperature is less than the target temperature.

6. The apparatus of claim 1, wherein the one or more memory devices are further configured to store instructions thereon that, when executed by the one or more processors, cause the one or more processors to:

compare the current temperature to the cleaning threshold temperature and a loading threshold temperature;

increment the available idle time parameter value when the current temperature is greater than the cleaning threshold temperature;

hold the available idle time parameter value when the current temperature is less than or equal to the cleaning threshold temperature and greater than or equal to the loading threshold temperature; and decrement the available idle time parameter value when the current temperature is less than the loading threshold temperature.

7. The apparatus of claim 1, wherein the one or more memory devices are further configured to store instructions thereon that, when executed by the one or more processors, cause the one or more processors to:

compare the current temperature to the cleaning threshold temperature and a loading threshold temperature;

decrement a remaining time to clean when the current temperature is greater than the cleaning threshold temperature;

hold the remaining time to clean when the current temperature is less than or equal to the cleaning threshold temperature and greater than or equal to the loading threshold temperature;

increment the remaining time to clean when the current temperature is less than the loading threshold temperature; and wherein the GUI further includes the remaining time to clean.

8. A system, comprising:

a sensor configured to be positioned downstream of an engine and upstream of a aftertreatment system catalyst;

one or more processing circuits comprising one or more memory devices coupled to one or more processors, the one or more memory devices configured to store instructions thereon that, when executed by the one or more processors, cause the one or more processors to:

receive a target temperature and store the target temperature on the one or more memory devices;

receive temperature information from the sensor;

generate a current temperature based on the temperature information;

compare the current temperature to the target temperature;

generate a loading instruction for loading the engine based on the comparison of the current temperature and the target temperature;

compare the current temperature to a cleaning threshold temperature and a loading threshold temperature;

determine a remaining time to clean based on an amount of time to apply the loading instruction;

decrement the remaining time to clean when the current temperature is greater than the cleaning threshold temperature;

hold the remaining time to clean when the current temperature is less than or equal to the cleaning threshold temperature and greater than or equal to the loading threshold temperature; and increment the remaining time to clean when the current temperature is less than the loading threshold temperature; and a human machine interface (HMI) including a display and configured to generate a graphical user interface (GUI) including the output target temperature, the output current temperature, the output loading instruction, and the remaining time to clean.

9. The system of claim 8, wherein the current temperature includes a current temperature value and a current temperature code.

10. The system of claim 9, wherein the one or more memory devices are further configured to store instructions thereon that, when executed by the one or more processors, cause the one or more processors to:

generate a first current temperature code when the current temperature is greater than the cleaning threshold temperature;

generate a second current temperature code when the current temperature is less than or equal to the cleaning threshold temperature and greater than or equal to the loading threshold temperature; and generate a third current temperature code when the current temperature is less than the loading threshold temperature.

11. The system of claim 8, wherein the loading instruction includes an apply more load instruction or a hold engine load instruction, and a loading code.

12. The system of claim 11, wherein the one or more memory devices are further configured to store instructions thereon that, when executed by the one or more processors, cause the one or more processors to:

compare the current temperature to the target temperature;

generate a loading code indicative of a satisfactory engine loading when the current temperature is greater than or equal to the target temperature; and generate a current temperature code indicative of an unsatisfactory current temperature when the current temperature is less than the target temperature.

13. The system of claim 8, wherein the one or more memory devices are further configured to store instructions thereon that, when executed by the one or more processors, cause the one or more processors to:

increment an available idle time parameter value when the current temperature is greater than the cleaning threshold temperature;

hold the available idle time parameter value when the current temperature is less than or equal to the cleaning threshold temperature and greater than or equal to the loading threshold temperature;

decrement the available idle time parameter value when the current temperature is less than the loading threshold temperature;

generate a first idle code when the available idle time parameter value is greater than a warning idle time threshold;

generate a second idle code when the available idle time parameter value is less than or equal to the warning idle time threshold and greater than an alarm idle time threshold; and generate a third idle code when the available idle time parameter value is less than or equal to the alarm idle time threshold, wherein the GUI further includes the available idle time parameter value and the idle code.

14. A method, comprising:

receiving a target temperature;

storing the target temperature on one or more memory devices;

receiving temperature information from a sensor positioned downstream of an engine and upstream of an aftertreatment system catalyst;

generating a current temperature based on the temperature information;

comparing the current temperature to the target temperature;

generating a loading instruction based on the comparison of the current temperature and the target temperature;

comparing the current temperature to a cleaning threshold temperature and a loading threshold temperature;

incrementing an available idle time parameter value identifying an amount of time to load the aftertreatment system catalyst in the engine, when the current temperature is greater than the cleaning threshold temperature;

holding the available idle time parameter value when the current temperature is less than or equal to the cleaning threshold temperature and greater than or equal to the loading threshold temperature;

decrementing the available idle time parameter value when the current temperature is less than the loading threshold temperature; and generating a graphical user interface (GUI) including the output target temperature, the output current temperature, the output loading instruction, and the available idle time parameter value.

15. The method of claim 14, wherein the current temperature includes a current temperature value and a current temperature code.

16. The method of claim 15, further comprising:
generating a first current temperature code when the current temperature is greater than the cleaning threshold temperature;
generating a second current temperature code when the current temperature is less than or equal to the cleaning threshold temperature and greater than or equal to the loading threshold temperature; and
generating a third current temperature code when the current temperature is less than the loading threshold temperature.

17. The method of claim 14, wherein the loading instruction includes an apply more load instruction or a hold engine load instruction, and a loading code.

18. The method of claim 17, further comprising:
comparing the current temperature to the target temperature;
generating a loading code indicative of a satisfactory engine loading when the current temperature is greater than or equal to the target temperature; and
generating a current temperature code indicative of an unsatisfactory current temperature when the current temperature is less than the target temperature.

19. The method of claim 14, further comprising:
generating a first idle code when the available idle time parameter value is greater than a warning idle time threshold;
generating a second idle code when the available idle time parameter value is less than or equal to the warning idle time threshold and greater than an alarm idle time threshold;
generating a third idle code when the available idle time parameter value is less than or equal to the alarm idle time threshold,
decrementing a remaining time to clean when the current temperature is greater than the cleaning threshold temperature;
holding the remaining time to clean when the current temperature is less than or equal to the cleaning threshold temperature and greater than or equal to the loading threshold temperature;
incrementing the remaining time to clean when the current temperature is less than the loading threshold temperature; and
wherein generating the GUI further includes the idle code and the remaining time to clean.

* * * * *